March 7, 1961 W. E. BRANDT 2,973,606
MACHINE FOR PRECISION FINISHING OF PARTS BY CONTROLLED VIBRATION
Filed Oct. 9, 1959 10 Sheets-Sheet 1

FIG-1

INVENTOR
William E. Brandt,
BY John B. Brady
ATTORNEY

March 7, 1961 W. E. BRANDT 2,973,606
MACHINE FOR PRECISION FINISHING OF PARTS BY CONTROLLED VIBRATION
Filed Oct. 9, 1959 10 Sheets-Sheet 8

FIG. 8

INVENTOR
William E. Brandt,
BY
John B. Brady
ATTORNEY

United States Patent Office 2,973,606
Patented Mar. 7, 1961

2,973,606

MACHINE FOR PRECISION FINISHING OF PARTS BY CONTROLLED VIBRATION

William E. Brandt, Red Lion, Pa., assignor to Lord Chemical Corporation, York, Pa., a corporation of Pennsylvania Filed Oct. 9, 1959, Ser. No. 845,526

20 Claims. (Cl. 51—163)

My invention relates broadly to the precision finishing of parts by controlled vibration, in a submerged mass of media and parts, and more particularly to an improved method and apparatus for producing controlled vibration and for handling parts and media subjected to vibratory treatment.

One of the objects of my invention is to provide a construction of vibratory machine having a detachable and replaceable bowl for receiving parts and media and wherein the bowl is readily removed from the vibratory machine without disturbing other mechanisms associated with the machine.

Another object of my invention is to provide an arrangement of hydraulically operated means for dumping parts and media after treatment from the bowl of a vibratory machine eliminating gear mechanism heretofore required.

Another object of my invention is to provide an improved arrangement of cradle assembly and eccentric mounting for imparting vibratory movement to the bowl of a vibratory machine.

Still another object of my invention is to provide an arrangement of belt drive tensioning means adjustable from the front of the cradle of the vibratory machine by which operation of the machine is readily controlled.

A still further object of my invention is to provide a method of treating parts submerged in media for inducing a scrubbing of the parts through three directional movement of the parts and the media laterally of a vibratory bowl in which changes in direction of movement of the parts and media are effected adjacent the interior sidewalls of the vibratory bowl.

A still further object of my invention is to provide an improved composite coil and leaf spring mounting of a holder for a detachable and replaceable bowl for transmitting to the bowl vibratory movements for inducing corresponding movements in a mass of media and articles under treatment.

A still further object of my invention is to provide an improved mechanism for mounting a detachable vibratory bowl by which the frequency of vibration of the bowl and media and parts submerged therein may be controlled over a substantial frequency range.

Still another object of my invention is to provide an arrangement of fluid discharge means for a vibratory bowl assembled within a holder and associated cradle whereby chemical may be readily drained from the contents of media and parts within the vibratory bowl.

A further object of my invention is to provide a construction of cradle for a vibratory machine in which a mounting means for a vibratory bowl is located in off-center relation longitudinally of the cradle, providing space for an adjustable mechanism adjacent one end of the cradle for compensating for variations in weight of materials in the bowl with respect to the drive mechanism for the bowl.

A further object of my invention is to provide an arrangement of hoist bar assembly on the cradle of a vibratory machine for facilitating the attachment of a loading chute for materials and media over the bowl.

Other and further objects of my invention reside in the improved structural assembly of resiliently mounted detachable bowl in a tiltable cradle of a vibratory machine and drive mechanism therefor as set forth more fully in the specification hereinafter following by reference to the accompanying drawings in which:

Fig. 3 is a rear elevational view of the machine illustrated in Figs. 1 and 2;

My invention is directed to a method and machine for the precision finishing of parts by controlled vibration of the type shown in my co-pending applications Serial No. 641,399, filed February 20, 1957, for Method and Apparatus for Precision Finishing of Parts and Objects by Controlled Vibration, and Serial No. 760,493, filed October 15, 1958, now abandoned, for Machine for Precision Finishing of Parts by Controlled Vibration. My invention herein provides means for controlling vibration for precision finishing of a broad range of types, shapes, and sizes of metal, plastic, and wooden parts. The machine of my present invention operates from 10 to 100 times faster than tumbling barrels and will work more economically and will achieve results which cannot be obtained by tumbling barrels. In addition to cleaning, descaling, deburring, radiusing, fine finishing, coloring, burnishing and ball burnishing, the machine of the instant invention yields interior finishes and finishes in shielded areas of parts being treated. The machine of my invention performs on the coarsest work, requiring severe cut-down, as well as upon the most delicate precision work. I treat parts in abrasive media to which chemicals may be added where the media and parts are subjected to vibration in such manner that the entire mass moves laterally and vertically and horizontally within the bowl with certain parts of the mass moving in three directions and producing a scrubbing action throughout the mass induced by relative motion between the load components.

Both amplitude and frequency of vibration can be varied in the machine of my instant invention to fit a wide variety and range of requirements. The machine may be arranged for fixed or variable frequency and speed of operation and in the amplitudes required for the particular work in hand. In the machine of the instant invention the vibratory bowl is detachable from and connectable to a holder supported with respect to a tiltable cradle to enable the bowl to be removed for repair or relining without disturbing the other mechanisms of the machine. Heretofore, removal of the bowl for relining has meant the complete shutdown of the machine for a substantial period of time. In the instant case, however, the bowl is removed from the holder on the cradle by simply removing certain holding bolts, enabling a replacement bowl to be readily inserted into position, thereby restoring the machine to normal operation with no appreciable shutdown period.

In the instant machine, the bowl holder is resiliently supported in a position offset longitudinally of the cradle to provide the necessary space on the cradle for adjustment means whereby the vibrator may be controlled to handle from extremely light to very heavy loads. The cradle carries means thereon for supporting a chute facilitating loading of the bowl from an overhead position. This means may be moved out of obstructing position when not in use. A special combination of leaf springs and coil springs is provided at each end of the bowl holder for mounting the bowl holder with respect to the cradle. A special arrangement for journaling the holder for the bowl is provided with drive means extending from the eccentric to a suitable rotative drive with adequate provision for maintaining the drive effectively in alignment with the eccentric.

Special provision is made for draining the detachable bowl through a drainage spout extending between the coil and leaf spring combination adjacent one end of the cradle. The bowl holder is resiliently supported by a combination of leaf and coil springs interposed between the cradle and the opposite ends of the bowl holder for effecting a restoring action on the bowl holder and the associated bowl for each displacement of the bowl holder through operation of the eccentric.

I mount on the cradle a foldable hoist bar assembly for enabling a loading chute to be positioned directly over the open bowl for loading the bowl. The hoist bar assembly is foldable out of position after the bowl has been loaded with media, parts and chemicals, and the rinse cover applied in position.

Referring more particularly to the drawings, reference character 1 designates the base assembly for the vibrator including a pair of end frames 2 and 3 interconnected by a tie member 4. The end frames 2 and 3 provide supports for journaling means 5 and 6 in which the cradle 7 is mounted for tilting movement in stub shafts 8 and 9. The cradle 7 is formed by an assembly of longitudinally and laterally extending channels providing a rectangular structure having a substantially flat top with an offset rectangular recess 10 arranged adjacent one end of the cradle as shown, leaving a working space 11 adjacent the other end of the cradle which houses adjusting mechanism hereinafter described in more detail. Within the recess 10 of the cradle there is mounted a holder indicated at 12. The holder 12 is semi-cylindrical and has upstanding side walls indicated at 14 which are welded to angle members 15 having horizontally extending flanges 16 to which angle members 17, fastened to the removable bowl 18, may be removably connected through bolts 19. That is to say, bowl 18 may be mounted on the flanges 16 of angle members 15 by means of the attachment bolts 19 or removed therefrom by removing the attachment bolts 19 for replacement of another bowl. The fact that bowl 18 may be removably mounted in holder 12 greatly increases the efficiency and usefulness of the machine as the bowl may be renewed from time to time without disturbing other mechanisms forming part of the machine. This is particularly helpful when it is necessary to replace the rubber liner 20 within the interior of the bowl 18. Heretofore, where the bowl has been assembled directly with the eccentric drive, it has been necessary to dismantle the drive in order to remove the bowl which has required a complete shut-down of the machine over a substantial time period. In my improved construction the bowl has been made an independent part of the machine and mounted on the holder so that it may be readily removed from and replaced in the holder.

The drive for imparting vibration to the holder 12 consists of an eccentric 21 provided with cylindrical shoulders 22 and 23 and cylindrical extensions 24 and 25. The shoulders 22 and 23 pass through centering plates 26 and 27 mounted in journal supports 28 and 29 carried in the depending extensions 30 and 31 on the ends of the holder 12. The journal supports 28 and 29 each carries ball bearing raceways 32 and 33 in which the extensions 24 and 25 are journaled. There is a cover plate 34 over the journal support 28. The journal support 29 is provided with an apertured cover plate 35 through which the extension 36 on the eccentric 21 extends and from which the stub shaft 37 projects and establishes connection to the flexible coupling 38 leading to the drive shaft 39 shown more clearly in Fig. 8.

Figure 8:
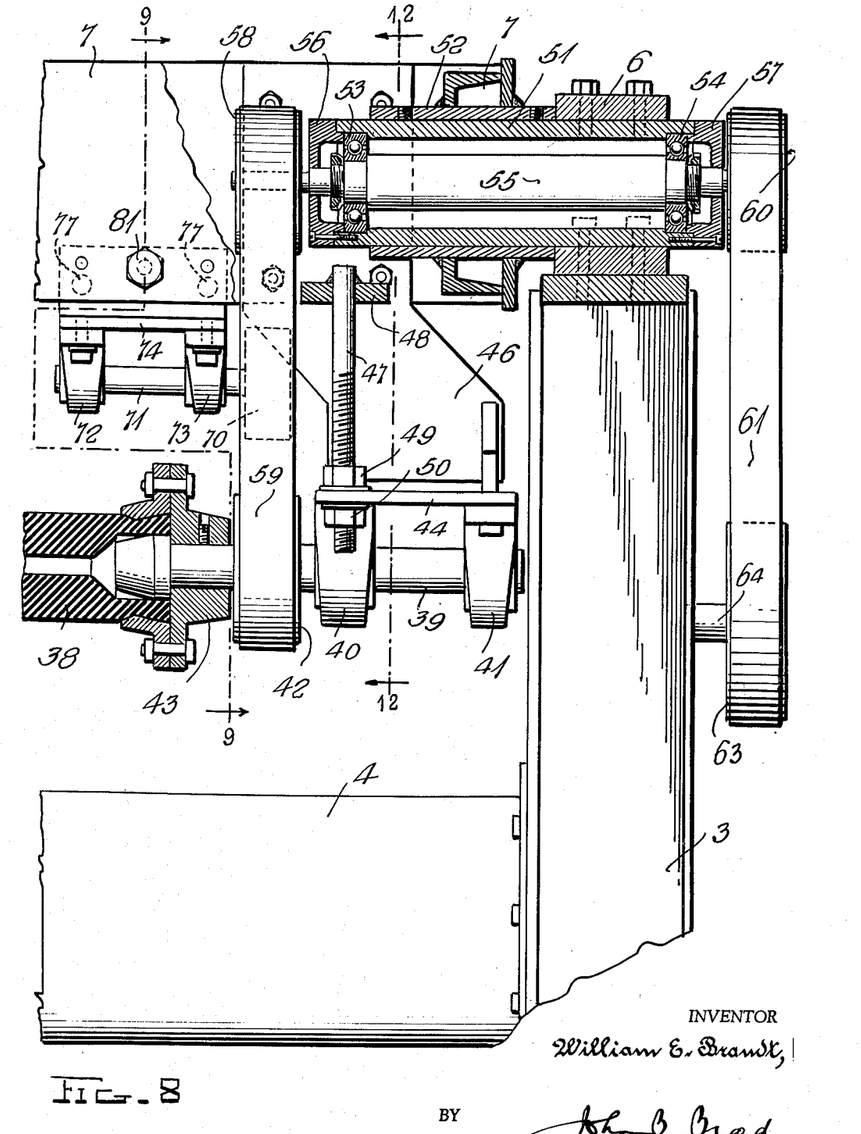
Fig. 8 is an enlarged longitudinal sectional view of a fragmentary portion of one end of the vibratory machine taken on line 8—8 of Fig. 2 and illustrating particularly the manner of supporting the drive means for the eccentric associated with the holder for the bowl of the vibratory machine.

The drive shaft 39 is journaled in bearings 40 and 41 and carries the pulley 42 and extends into the coupling member 43 which establishes connection with the flexible coupling 38. The bearings 40 and 41 depend from the plate 44 which is fulcrumed at the remote end thereof at 45 on the depending member 46 fastened to the interior of the longitudinally extending side wall of the cradle 7 as shown more clearly in Fig. 9. The opposite end of the plate 44 is apertured for the passage of the depending screw-threaded member 47 which is supported from the bracket 48 secured to the interior side wall of the cradle 7, as shown more clearly in Fig. 9. The screw-threaded member 47 is provided with adjustable nuts 49 and 50 which engage the screw-threads on the screw-threaded member 47 and which permits plate 44 to be raised or lowered around the fulcrum 45, thereby changing the center of pulley and corresponding the center of drive of coupling 38 leading to the stub shaft 37.

Figure 1:
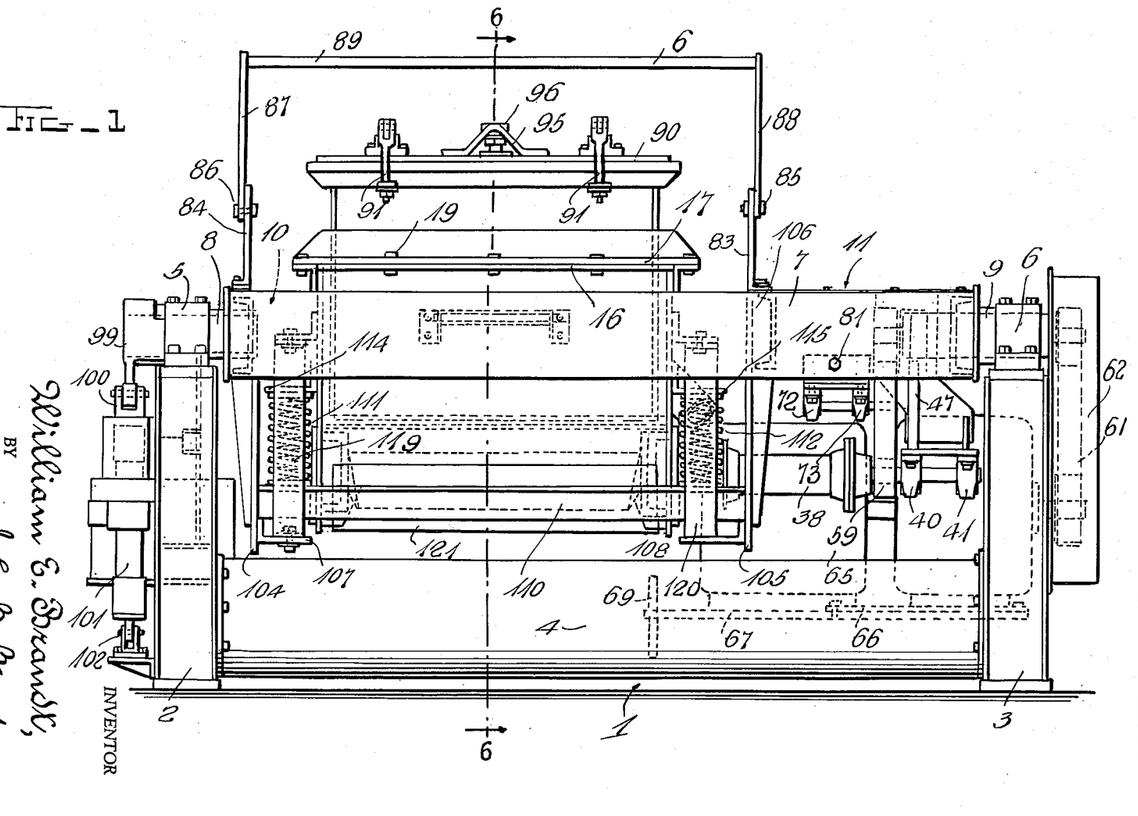
Fig. 1 is a front elevational view of the improved vibratory machine of my invention, illustrating the hoist bar raised in position ready to receive a loading chute over the bowl of the machine.
Figure 2:
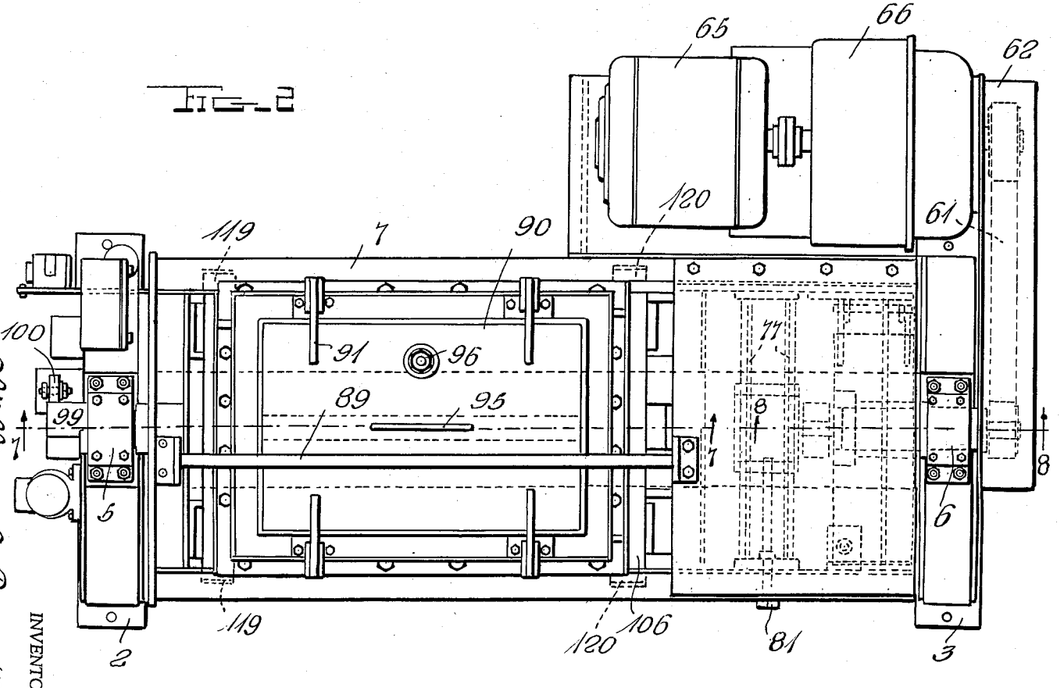
Fig. 2 is a top plan view of the machine shown in Fig. 1.
Figure 4:
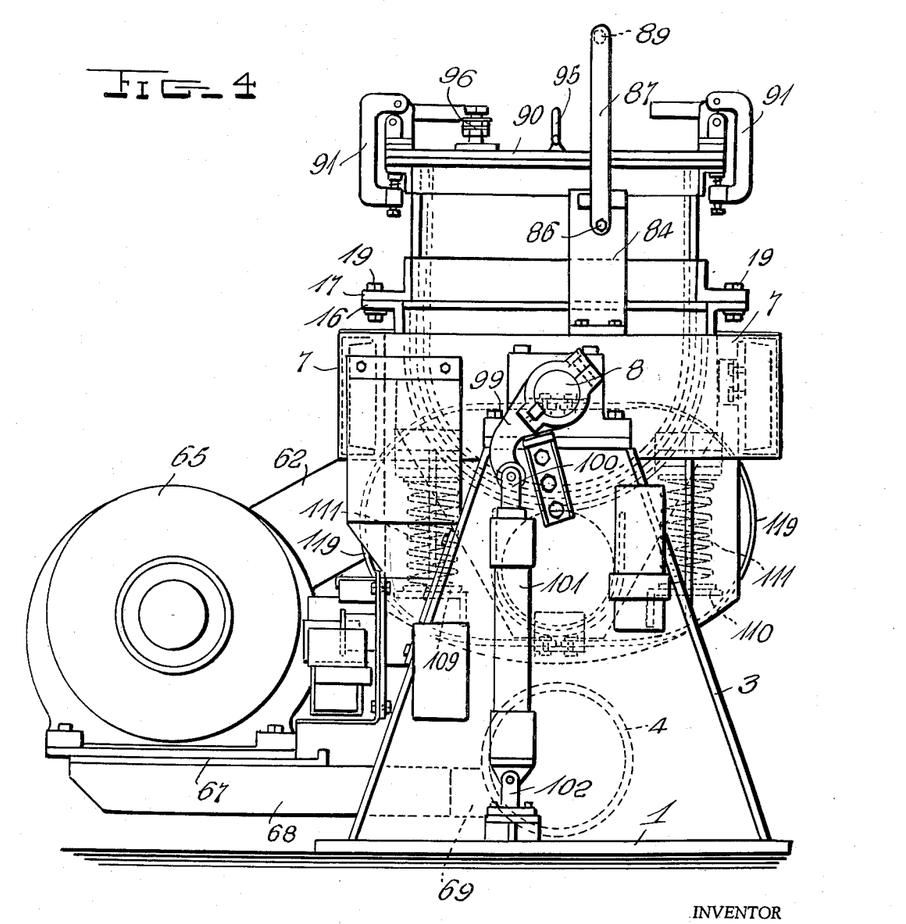
Fig. 4 is an end view of the machine shown in Figs. 1–3, and illustrating particularly the arrangement of the hydraulic tilt mechanism for the cradle of the machine.
Figure 5:
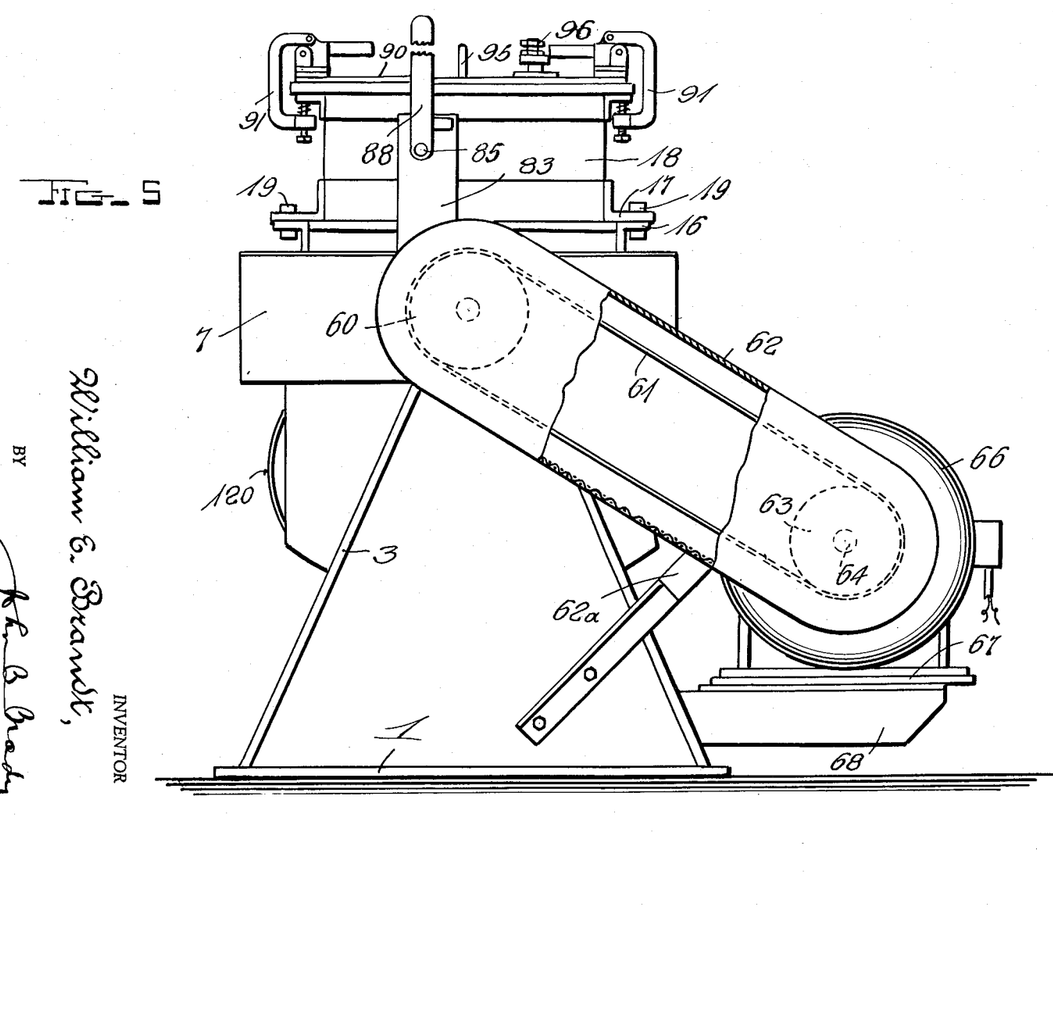
Fig. 5 is an end view of the machine shown in Figs. 1–3, looking in the direction of arrow A in Fig. 3, and showing the casing around the drive belt broken away to illustrate the drive mechanism more clearly.
Figure 6:
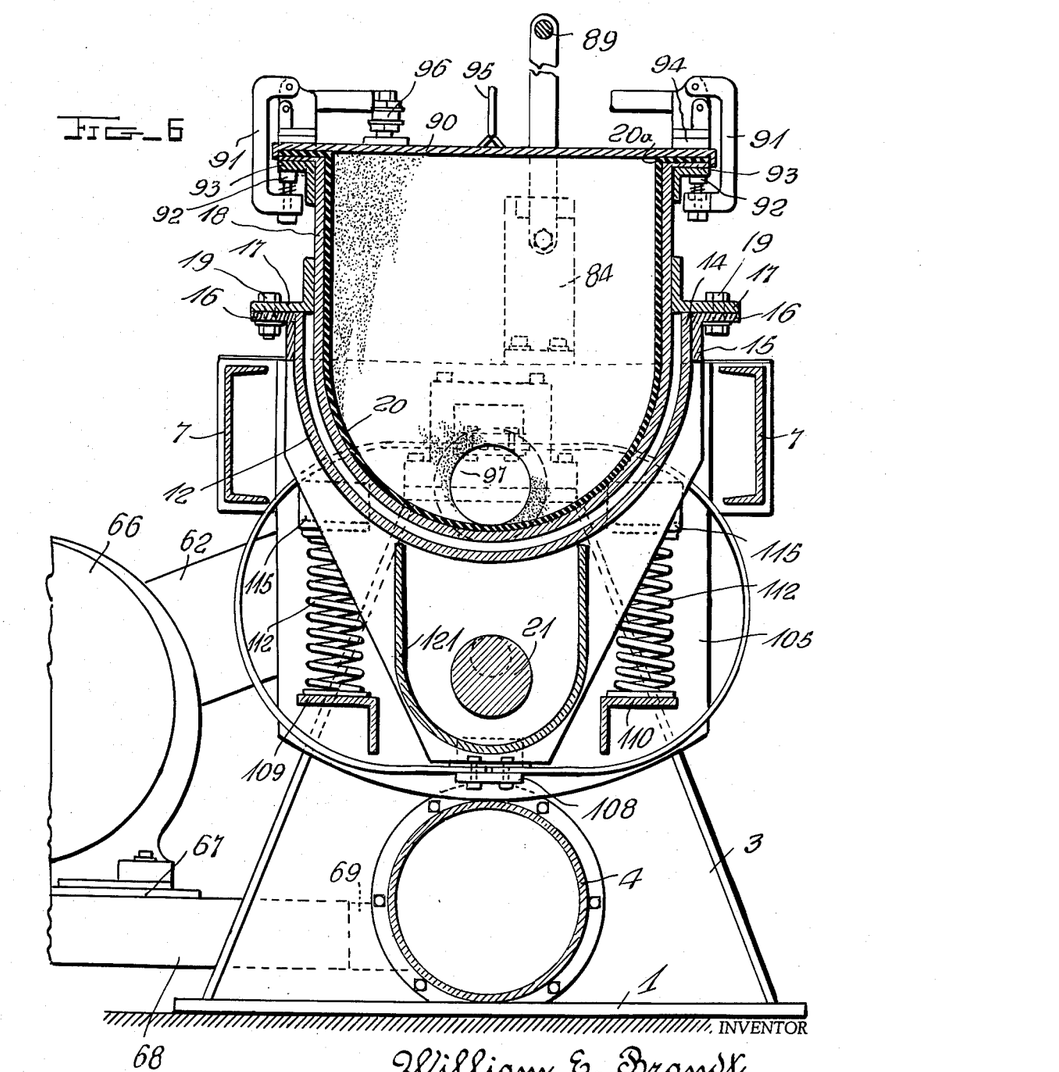
Fig. 6 is a transverse vertical sectional view taken on line 6—6 of Fig. 1, and illustrating particularly the removable bowl which is readily replaceable in the vibrator without disturbing other mechanisms of the vibrator.
Figure 7:
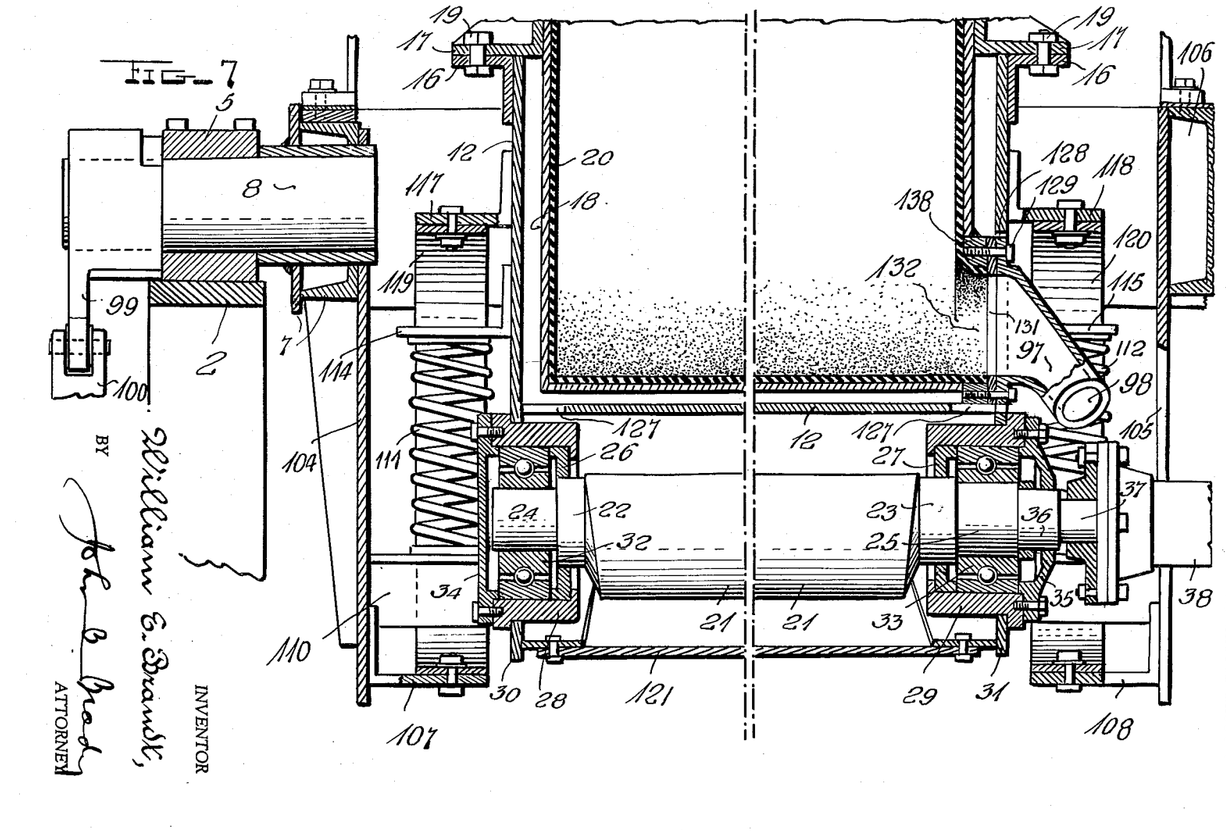
Fig. 7 is a longitudinal sectional view through the vibratory machine of my invention on line 7—7 of Fig. 2, the view being foreshortened in order to illustrate the parts on a larger scale.

Immediately above the drive shaft 39 and extending through the end of the cradle 7, I arrange a shaft housing 51 mounted in the cylindrical sleeve 52 carried in the end of the cradle 7. The shaft housing 51 provides a mounting means for the ball-races 53 and 54 at opposite ends of the shaft housing 51 within which the rotary shaft 55 is journaled. Annular closure members 56 and 57 are arranged at opposite ends of the shaft housing 51 through which the opposite ends of rotary shaft 55 extend. The end of the shaft 55 which projects interiorly of cradle 7 carries the drive pulley 58 which is aligned with pulley 42 on shaft 39. Pulley 58 is engaged by belt 59 which engages pulley 42 for transmitting rotary motion from shaft 55 to shaft 39. The opposite end of shaft 55 carries pulley 60 which is engaged by the belt 61 which extends rearwardly of the machine, as shown more clearly in Fig. 5, within the protective guard 62 and is engaged by pulley 63 carried by drive shaft 64, driven by variable speed motor 65 through the speed reduction gear 66. Guard 62 is braced with respect to the base assembly 1 and the end frame 3 by means of bracket 62a. Motor 65 is supported on base 67 carried by bracket 68 supported on the base assembly 1 and braced against the tie member 4 by strut 69.

Figures 9, 10, 11, 12:
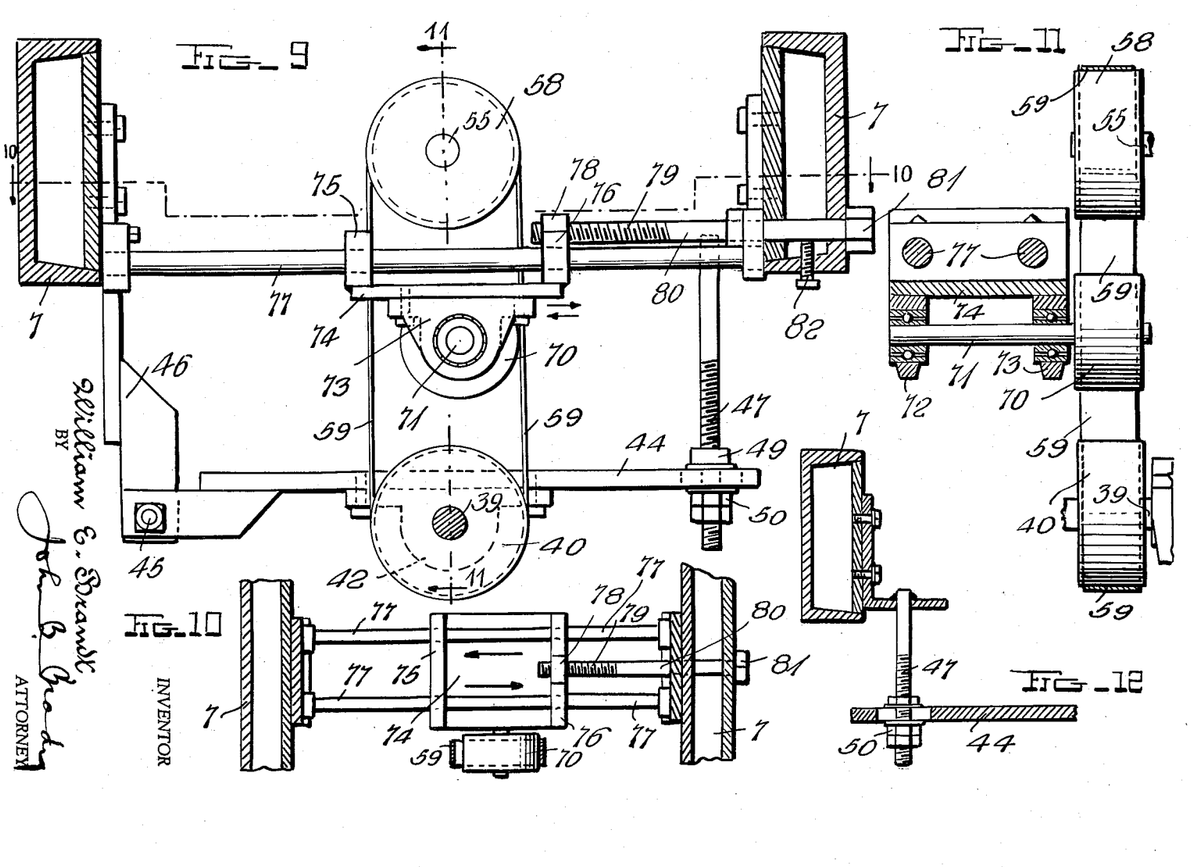
Fig. 9 is a transverse sectional view through the cradle taken substantially on line 9—9 of Fig. 8, the view being drawn on an enlarged scale to illustrate the mechanism which permits compensation for variations in weight of materials in the bowl whereby the vibrator may be adjusted to handle from extremely light to very heavy loads.
Fig. 10 is a transverse sectional view on a smaller scale on line 10—10 of Fig. 9.
Fig. 11 is a vertical sectional view taken substantially on line 11—11 of Fig. 9.
Fig. 12 is a detail view of the mounting means for the drive for the eccentric with respect to the cradle, the view being taken on line 12—12 of Fig. 8.

The belt 59 may be adjusted intermediate the drive pulley 58 and pulley 42 by the assembly shown more clearly in Fig. 9, wherein an idler roller 70 mounted on shaft 71 may be adjusted transversely of the cradle 7 with respect to the belt 59 for tensioning belt 59 in varying amounts. The shaft 71 is journaled in bearings 72 and 73 depending from the plate 74 which carries upstanding projections 75 and 76 thereon, which are apertured to slide on the transversely disposed bars 77 extending laterally of the interior of the cradle 7. The upstanding projection 76 is centrally screw-threaded at 78 to receive the screw-threaded end 79 of the adjustable member 80 which extends through the front of the cradle 7 and terminates in a headed end represented at 81. This headed end 81 may be engaged by a wrench and revolved to move the idler roller laterally of the cradle 7 for variably tensioning belt 59. When the desired tension is secured, set-screw 82 extending from a position beneath cradle 7, is screwed into firm engagement with the adjustable member 80 for maintaining the adjustable member 80 in the selected position. This adjustment is necessary when the loads deposited in the bowl vary and different adjustments are required in handling extremely light to very heavy loads.

In order to provide for the loading of the bowl 18 the cradle 7 is equipped with a hoist bar assembly constituted by upstanding brackets 83 and 84 which provide a pivotal connection at 85 and 86 for lever members 87 and 88 which carry the hoist bar 89 upon which the end of a loading chute may be connected for steadying the loading chute immediately over the open top of the bowl 18 for loading materials and media into the bowl 18. When the chute is removed the hoist bar is folded downwardly against the top of the cradle 7.

After the bowl has been loaded with materials, media, and where necessary chemicals, and after the vibratory cycle is completed, it is provided with a rinsing cover 90 which is clamped over the peripheral edge of the bowl and against the rubber flange 20a extending from the rubber liner 20 as shown more clearly in Figs. 1–6. The rinsing cover is maintained in position by adjustable clamps consisting of U-shaped brackets 91, each having an adjusted spring-ejected member 92 for engaging the lower face of the peripheral flange 93 of the bowl 18 located in one end of the bracket and a lever actuated clamp 94 located in the other end of the bracket 91. The lever actuated clamp 94 applies pressure against the top of the peripheral edge of the cover 90 while the spring-ejected members 92 grip the lower peripheral face of the peripheral flange 93, thereby detachably maintaining the rinsing cover in position on the bowl. The rinsing cover 90 has a central hood 95 thereon to facilitate lifting or lowering of the cover by means of a crane or block and tackle. A fluid tap 96 is provided in the cover 90 to facilitate the introduction of the washing fluid through the interior of the mass of the bowl and a drainage thereof through the drain spout, represented generally at 97, located at the base of the bowl 18. When not in use the drain spout 97 may be plugged or capped at the end 98 thereof. In certain installments it is desirable to omit drain spout 97 and to effect drainage of the bowl 18 by dumping the contents of the bowl which is effected by the hydraulic dump mechanism illustrated more clearly in Figs. 1–4 and Fig. 7. The hydraulic dump mechanism consists of a lever 99 which is attached to the end of stub shaft 8 and is engaged by the end of piston rod 100 of the hydraulic cylinder 101. Hydraulic cylinder 101 is pivoted at 102 with respect to the base assembly 1. Fluid connections indicated at 103 lead to the hydraulic cylinder 103 in Fig. 3, enabling fluid under pressure to be supplied by cylinder 101, moving piston rod 100 and communicating a force to lever 99 to provide sufficient turning torque to revolve stub shaft 8 for orienting cradle 7 to a position for discharging the contents of bowl 18.

The holder 12 is flexibly mounted with respect to the cradle 7. This is accomplished by providing depending transversely extending members 104 and 105 which project downwardly from cradle 7. Member 104 is attached to the end of cradle 7 while member 105 is attached to a transversely extending member 106 within the cradle 7. The depending members 104 and 105 carry brackets 107 and 108 extending inwardly toward each other as shown more clearly in Figs. 1 and 7 which provide mounting means for sets of composite coil and leaf springs. In order to provide seats for the coil springs, I position two angle members 109 and 110 which extend the entire distance between the depending plates 104 and 105 and have horizontally extending flanges on which sets of coil springs 111 and 112 are supported. Each set of coil springs consists of two compression type springs seated on the flanges of angles 109 and 110 at the lower ends thereof and attached at the upper ends thereof to sets of brackets 114 and 115 extending from opposite ends of the holder 12. Thus holder 12 is supported on pairs of symmetrically arranged coil springs on opposite ends thereof. In addition to this the holder 12 carries centrally arranged brackets 117 and 118 at opposite ends thereof. Elliptical leaf springs 119 and 120 are disposed between the lower brackets 107 and 108 on the depending members 104 and 105 attached to the cradle 7, and the upper brackets 117 and 118 on the bowl holder 12. Thus each end of bowl holder 12 is supported by a transverse array of coil springs and an elliptical leaf spring interposed between the cradle 7 and the bowl holder 12 where the coil springs are located within the limits of the elliptical leaf springs, that is, where the leaf springs encircle the coil springs and are coplanar therewith. By this arrangement controlled vibration is imparted to the bowl holder 12 by movement of the eccentric 21. The eccentric 21 is enclosed within a protective housing constituted by guard 121 which extends between the extensions 30 and 31 longitudinally beneath the bowl holder 12 as shown more clearly in Figs. 6 and 7.

The hydraulic controls for the machine are arranged in casings 122 and 123 illustrated more clearly in Fig. 3. The electrical controls for the variable speed motor 65 may be mounted on panel boards immediately adjacent the machine for controlling the starting, the time period operation, the stopping, and the reversal of the machine.

Figure 13:
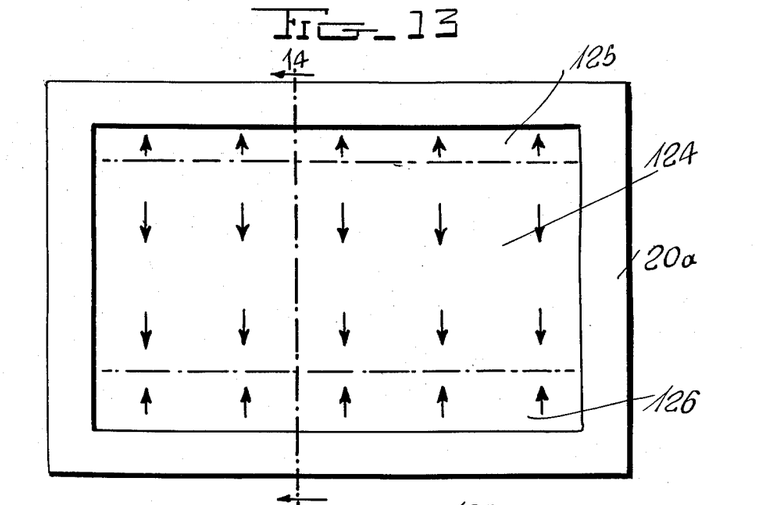
Fig. 13 is a theroretical view showing in plan the movement of the parts and media in the bowl of the vibratory machine.
Figure 14:
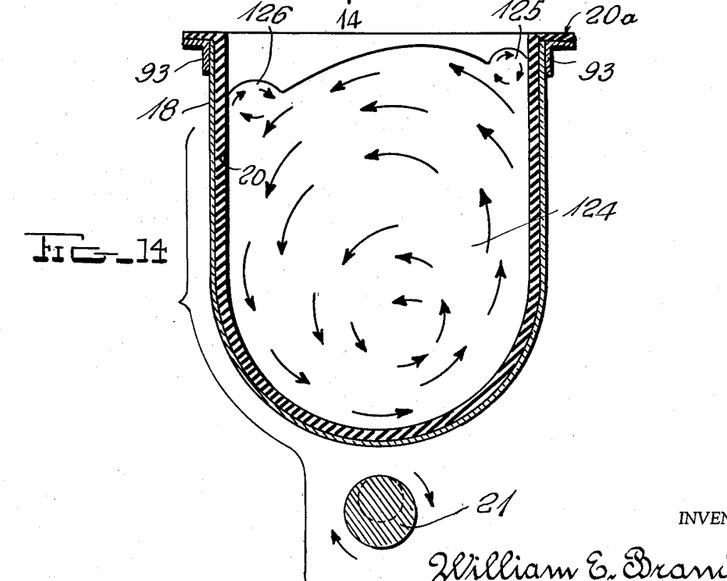
Fig. 14 is a transverse sectional view on line 14—14 of Fig. 13 through the vibratory bowl showing the internal movement of the parts and media during the submerged vibration treatment according to the method of my invention.

In Figs. 13 and 14 I have indicated by arrows the theory of operation of the machine of my invention wherein the eccentric 21 imparts to the bowl 18 a composite vertical and horizontal movement which is free to follow the displacement of the eccentric weight 21 for inducing in the mass of the materials and parts deposited within the bowl 18 a rotative movement of the mass following the paths designated at 124. These paths extend laterally or transversely of the bowl 18 as shown more clearly in Fig. 13. The mass movement of the material and media and the chemicals which may be contained therein produces a scrubbing action on the surface of the parts under treatment. The vibratory movement is such that lobes of movement are induced at the opposite interior side walls of the bowl 18, as represented at 125 and 126. The movements produced at the lobes are in reverse directions to the movements transversely of the bowl 18, so that actually bidirectional movements are produced, increasing the scrubbing action on the parts and also building up a mass adjacent each side of the interior of the bowl, increasing the weight thereof and thereby increasing the effect of the mass on the scrubbing of the surfaces of the parts under treatment. In Fig. 14 I have shown the distribution of movements for a clockwise rotation of eccentric 21. By reversing the direction of drive of eccentric 21 the reversal in direction of each of the movements depicted in Figs. 13 and 14 is obtained within the mass interiorly of the bowl for thus effecting by submerged abrasion a rapid and effective surface treatment of the parts within the moving mass interiorly of the bowl.

The continuous mass movement of the material and parts within the bowl 18 requires a smooth inner surface such as provided by the rubber liner 20 and there can be no obstruction within the mass interior of the bowl. The rubber liner 20 gradually wears away under continuous bombardment of the media and parts and for this reason the bowl 18 is made readily removable by withdrawal of the bolts 19 to enable the bowl 18 to be removed and a replacement bowl quickly inserted while the worn bowl is being repaired by relining. In effecting this replacement it is not necessary to disturb other mechanism forming part of the drive of the machine.

The bowl holder 12 is provided with access openings 127 in the bottom thereof adjacent the depending extensions 30 and 31 of the bowl holder to facilitate the mounting of the journal supports 28 and 29 in position during the assembly of the apparatus. The drain spout 97 extends through an opening 128 in the end extension 31 of the bowl holder and is removably fastened by bolts 129 to a ring frame 130 welded in the lower portion of the end wall of the bowl 18. The bolts 129 pass through a gasket 131 for maintaining the drain spout 97 in fluid-tight connection with the discharge opening of the bowl. The rubber liner 20 extends through the ring frame 130 to a sealing connection at 132 with gasket 131.

Wherever in the specification and claims I have referred to the hydraulic operating means for orienting the bowl to a position for dumping the media and material I have used the term hydraulic synonomously with pneumatic as either hydraulic operation by use of oil or pneumatic operation by use of air may be interchangeably employed for effecting operation of the dump control mechanism.

While I have described my invention in certain preferred embodiments I realize that modifications may be made and I desire that it be understood that no limitations upon my invention are intended other than may be imposed by the scope of the appended claims.

What I claim as new and desire to secure by Letters Patent of the United States is as follows:

1. A vibrating machine comprising a frame, a cradle journaled on a horizontal axis within said frame for orientation from a substantially horizontal position to a substantially vertical position, a bowl holder, means for resiliently supporting said bowl holder with respect to said cradle, means for imparting vibratory movement to said bowl holder and a removable attachable and detachable bowl insertable into and withdrawable from said bowl holder.

2. A vibrating machine as set forth in claim 1 in which said bowl holder is interiorly free and clear of all obstructions for the passage of said bowl into and out of said bowl holder, and means for supporting said bowl in spaced relation to the interior wall of said bowl holder.

3. A vibrating machine as set forth in claim 1 in which said means for imparting vibratory movement to said bowl holder consists of an eccentric journaled in the opposite ends of said bowl holder in a position separated from said removable bowl by the wall of said bowl holder.

4. A vibrating machine as set forth in claim 1 in which said means for imparting vibratory movement to said bowl holder comprises an eccentric journaled in said bowl holder and separated from said bowl by the wall of said bowl holder and a guard surrounding said eccentric enclosing the space between said eccentric and the bottom of said bowl holder.

5. A vibrating machine as set forth in claim 1 in which said bowl holder is provided with access openings in the bottom thereof and wherein said bowl is spaced from the interior of said bowl holder throughout substantially the entire area of the exterior wall of the bowl.

6. A vibrating machine as set forth in claim 1 in which the means for resiliently supporting said bowl holder with respect to said cradle comprises a composite array of symmetrically disposed compression springs and leaf springs arranged coplanar in positions intermediately opposite ends of the bowl holder and transverse portions of said cradle.

7. A vibrating machine as set forth in claim 1 in which said means for resiliently supporting said bowl holder with respect to said cradle comprise substantially elliptical leaf springs supported at their lower ends with respect to said cradle and connected at their upper ends with respect to said bowl holder and compression coil springs interposed between said cradle and said bowl holder, said compression coil springs being mounted substantially coplanar with the planes of said substantially elliptical leaf springs and being encompassed within the dimensional limits of said substantially elliptical leaf springs.

8. A vibrating machine as set forth in claim 1 in which there is a pneumatically operated mechanism for effecting the orientation of said cradle.

9. A vibrating machine as set forth in claim 1 in which there is a hydraulically operated mechanism for effecting the orientation of said cradle.

10. A vibrating machine comprising a frame, a substantially rectangular cradle journaled on a horizontal axis at opposite ends thereof with respect to said frame, said cradle having an opening extending therethrough and offset toward one end thereof, a pair of depending plates connected with said cradle adjacent the opposite end limits of the opening therethrough, said depending plates being connected adjacent the lower ends thereof by a pair of spaced longitudinally extending members, said depending plates having brackets mounted on the lower ends thereof beneath the said spaced longitudinally extending members, a bowl holder arranged in said opening, brackets attached to opposite ends of said bowl holder and aligned over the brackets carried by said depending plates, substantially elliptical leaf springs supported at their lower ends on the brackets carried by said depending plates and secured at their lower ends to the brackets attached to the opposite ends of said bowl holder, additional brackets secured to opposite ends of said bowl holder in transversely spaced positions in alignment with the spaced longitudinally extending members which interconnect said depending plates, compression coil springs disposed between said spaced longitudinally extending members and said last mentioned brackets in positions substantially coplanar with said substantially elliptical-shaped coil springs and in positions disposed within the dimensional limits of said substantially elliptical leaf springs, a bowl removably supported within said bowl holder, and means for imparting vibratory movement to said bowl holder for communication to said bowl.

11. A vibrating machine as set forth in claim 10 in which said frame comprises a pair of vertically extending end members which support bearings for journaling the cradle and wherein said end members are interconnected by a central horizontally disposed tubular member forming a tie for maintaining said end members vertically erect.

12. A vibrating machine as set forth in claim 10 in which said means for imparting vibratory movement to said bowl holder for communication to said bowl comprises an eccentric mass disposed on an axis extending beneath said bowl holder and journaled at opposite ends in said depending plates, said eccentric mass being so distributed that in the course of rotation thereof the said mass extends beneath the plane of said spaced longitudinally extending members.

13. A vibrating machine as set forth in claim 10 in which said means for imparting vibratory movement to said bowl holder for communication to said bowl comprises an eccentric mass disposed on a horizontal axis extending below the bowl holder in a position intermediate the compression coil springs and a guard extending around said eccentric mass and connected with the exterior of the bottom of said bowl holder intermediate the planes of the longitudinal axes of said compression coil springs and the axis of said eccentric mass.

14. A vibrating machine as set forth in claim 10 in which said bowl holder includes an aperture adjacent the bottom thereof at one end of the bowl holder and wherein there is a drain spout connected with said bowl and extending through the aperture in said bowl holder to a drainage position beyond said bowl holder and intermediate said coil springs.

15. A vibrating machine as set forth in claim 10 in which said means for imparting vibratory movement to said bowl holder for communication to said bowl includes a revolvable eccentric mass journaled longitudinally in said bowl holder, a driving motor mounted on said frame, a driven shaft extending through the journal from one end of said cradle, means for driving said shaft from said motor, a pulley carried by said shaft interior of said cradle, a rotatable eccentric mass journaled in said depending plates beneath said bowl holder, a shaft extending from said rotatable eccentric mass and a pulley thereon, a belt engaging said last mentioned pulley and driven from said first mentioned pulley.

16. Drive means for a vibratory bowl of a vibrating machine comprising a frame, a cradle journaled in said frame, a bowl holder resiliently supported in said cradle, said bowl holder including depending plates at opposite ends thereof, an eccentric mass journaled in said depending plates and terminating in a drive shaft, a pulley on said drive shaft, a flexible coupling interposed between said pulley and said eccentric mass, externally mounted rotary drive means on said frame, a drive shaft arranged coaxially with the journal of said cradle in said frame, a pulley on said drive shaft disposed within said cradle and vertically aligned with the pulley on said drive shaft, a belt interconnecting said pulleys for rotatably driving said eccentric mass from the externally mounted rotary drive means on said frame, and a bowl detachably mounted in said bowl holder for receiving media and material to be subjected to vibration corresponding to the movement of said eccentric mass.

17. Drive means for a vibratory bowl of a vibrating machine as set forth in claim 16 including an adjustable idler roll mounted on said cradle and aligned with said belt and means controlled from the exterior of said cradle for displacing said idler roll with respect to said belt for variably tensioning said belt with respect to said pulleys.

18. Drive means for a vibratory bowl of a vibrating machine as set forth in claim 16 which includes means on said cradle for adjusting the axis of said drive shaft with respect to the axis of said side eccentric mass.

19. Drive means for a vibratory bowl of a vibrating machine as set forth in claim 16 in which said drive shaft is mounted on a frame below said cradle and where one end of said frame is pivoted to a bracket depending from one side of said cradle and where the other end of said frame is adjustably mounted toward and away from the other side of said cradle whereby the axis of said drive shaft may be centered with respect to the axis of said eccentric mass.

20. Drive means for a vibratory bowl of a vibrating machine as set forth in claim 16 in which there are brackets mounted on the opposite interior walls of said cradle and a pair of rails extending between said brackets, a carrier slidable on said rails, an idler roller mounted on said carrier and adapted to invariably engage and tension said belt, a headed member extending transversely through one side of said cradle and having a screw-threaded terminus thereon engageable with a coacting screw-threaded portion of said carrier, said headed member being revolvable from the exterior of said cradle for advancing or retacting said carrier in a lateral direction on said rails for moving said idler roller against said belt for variably tensioning said belt.

No references cited.